Nov. 7, 1967   D. B. McILVIN   3,350,748
QUICK CHANGE MOLD ASSEMBLIES
Filed July 27, 1965   4 Sheets-Sheet 1

Inventor
Donald B. McIlvin
By his Attorney
Scott R. Foster

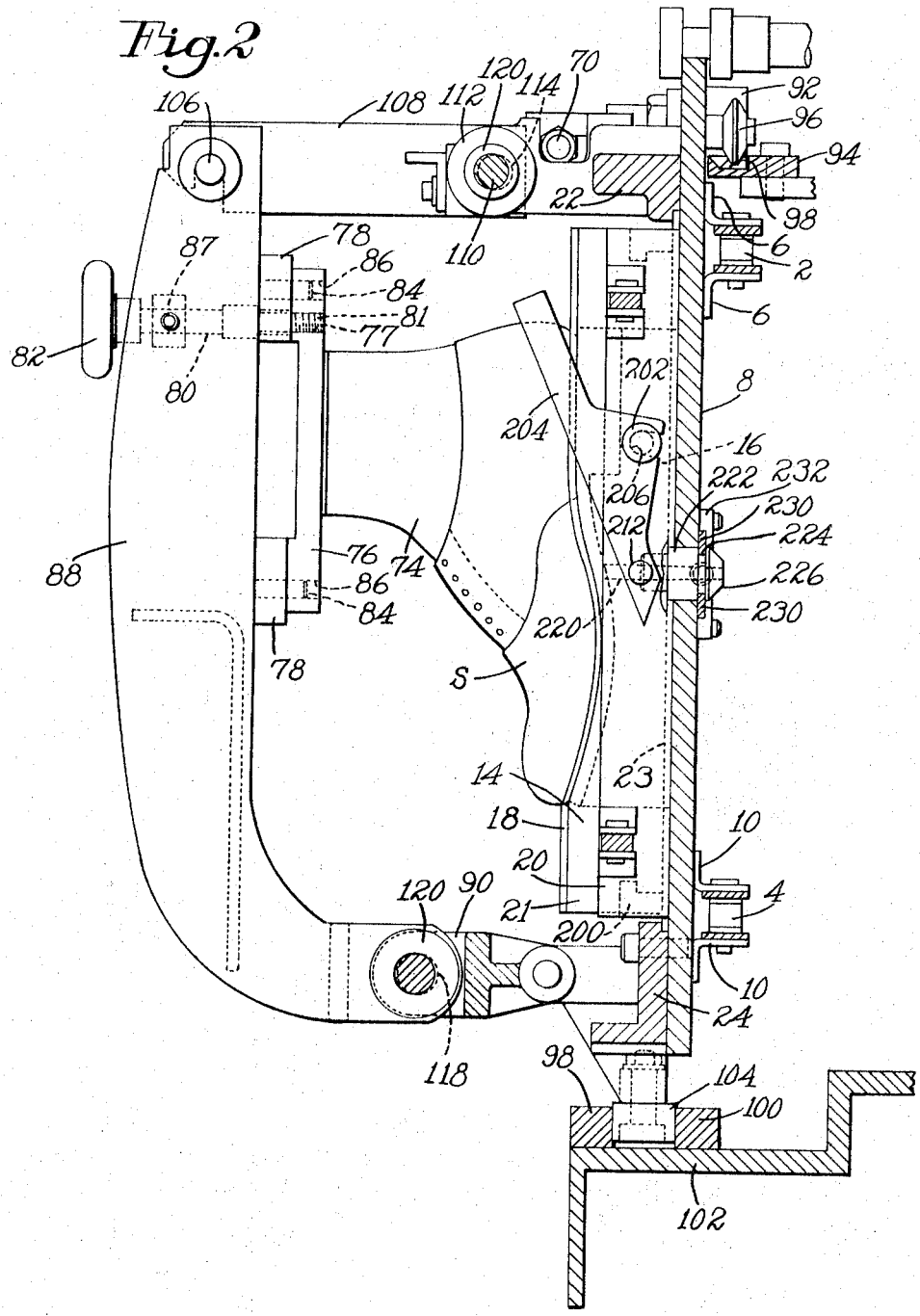

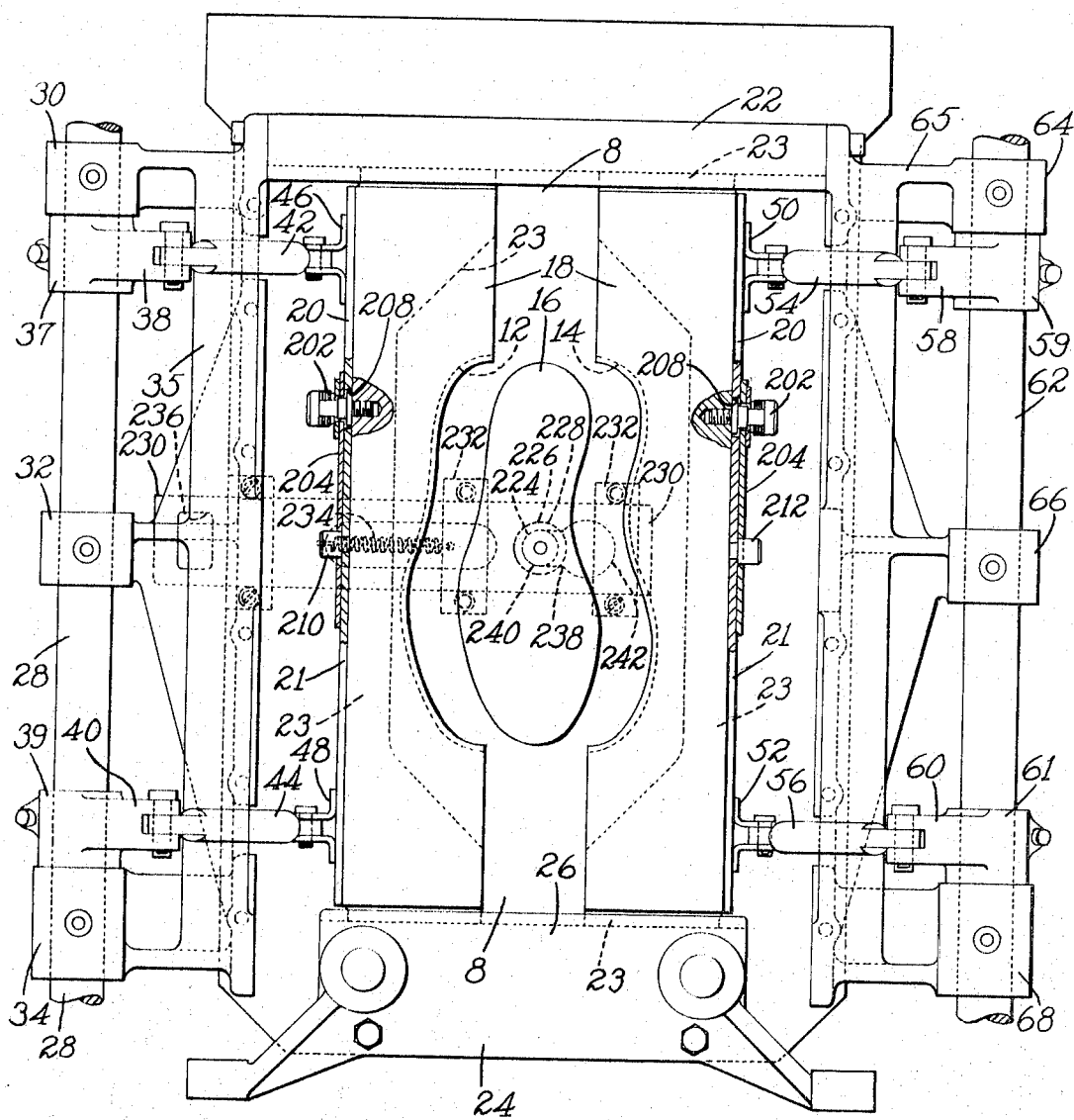

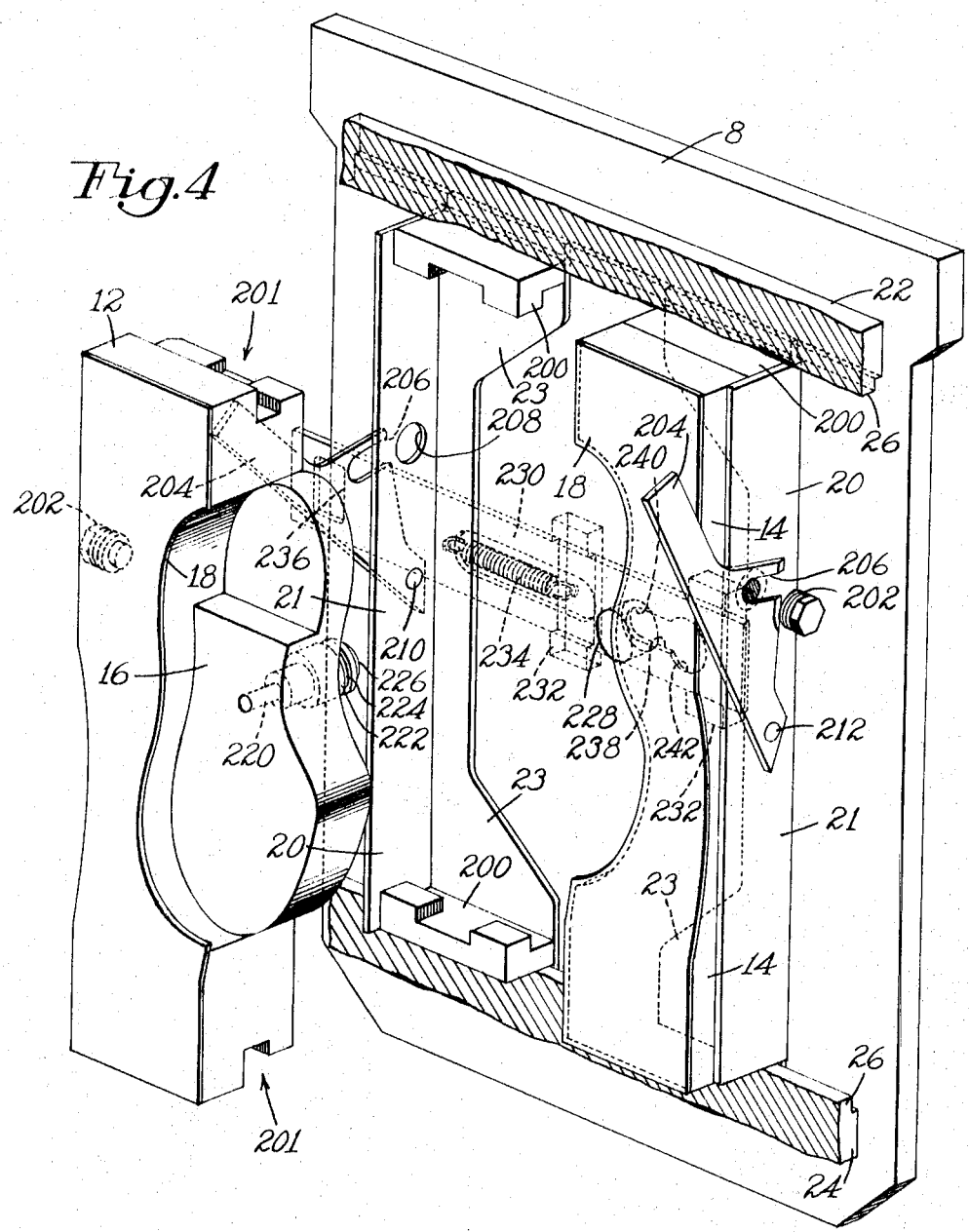

3,350,748
QUICK CHANGE MOLD ASSEMBLIES
Donald B. McIlvin, Danvers, Mass., assignor to United Shoe Machinery Corporation, Boston, Mass., a corporation of New Jersey
Filed July 27, 1965, Ser. No. 475,083
3 Claims. (Cl. 18—34)

ABSTRACT OF THE DISCLOSURE

A mold assembly comprising top, side and bottom mold members and top, side and bottom mold mounting means. The mold assembly is characterized by readily releasable mold mounting means for facilitating replacing of the mold members with members of different size or style. One of the mold member mounting means comprises a sprue member extending from the mold member and means for connecting the sprue member to a base plate.

---

This invention relates to injection molding machines and is herein illustrated in its application to machines for molding and attaching sole and heel units to the bottoms of lasted footwear. A machine of this type is disclosed, for example, in United States Letters Patent No. 3,006,032, granted Oct. 31, 1961, on an application filed in the names of Willard L. Baker et al. While the invention is herein illustrated in its application to machines for molding and attaching sole and heel units to the bottoms of lasted footwear, it is to be understood that the invention is not limited in scope to machines of this type but in certain aspects is applicable to injection molding machines generally.

The patent to Baker et al., above referred to, discloses a machine designed for high volume production of shoes having sole and heel units molded in situ thereon. The machine includes a conveyorized carrier for mounting a plurality of mold assemblies and means for positioning the mold assemblies sequentially in a mold charging station.

One problem encountered in the use of such a machine has been the rather long time required for substituting mold parts in the mold assemblies. When it is desired to accommodate a different size shoe, it is necessary to replace the footform, bottom member, and side mold members with corresponding members suitable for the new size shoe. Heretofore, this has been done largely by manually unbolting the various members and then bolting on the corresponding new members. Inasmuch as machines of this type generally carry from eight to sixteen mold assemblies, the extensive time required to completely change over all members in this manner may be readily recognized.

It is, accordingly, an object of the invention to provide a mold assembly in which the various mold members may be quickly and easily replaced by like members of different size or style.

It is a further object of the invention to provide such a mold assembly in which the removal and replacement of the mold members may be made without the necessity of applying hand tools.

With the above and other objects in view, as will hereinafter appear, the present invention contemplates the provision in a machine of the type above referred to of a mold assembly having readily releasable side mold members and lever means mounted on the mold assembly for securing and releasing the side mold members. In accordance with a further feature of the invention there is incorporated in the mold assembly a bottom mold member and slide means for quickly and easily securing and releasing the bottom mold member. In accordance with a still further feature of the invention there is incorporated in the mold assembly a shoe form which is readily releasable from its mounting for quick and easy replacement.

The above and other features of the invention including various novel details of construction and combinations of parts will now be more particularly described with reference to the accompanying drawings and pointed out in the claims. It will be understood that the particular machine embodying the invention is shown by way of illustration only and not as a limitation of the invention. The principles and features of this invention may be employed in varied and numerous embodiments without departing from the scope of the invention.

In the drawings:

FIG. 2 is a side elevational view with some parts in section;

FIG. 3 is a plan view; and

FIG. 4 is an exploded view of the portion of the illustrative machine embodying the invention showing how the bottom and side mold members are released and held by the mold assembly.

Figure 1:
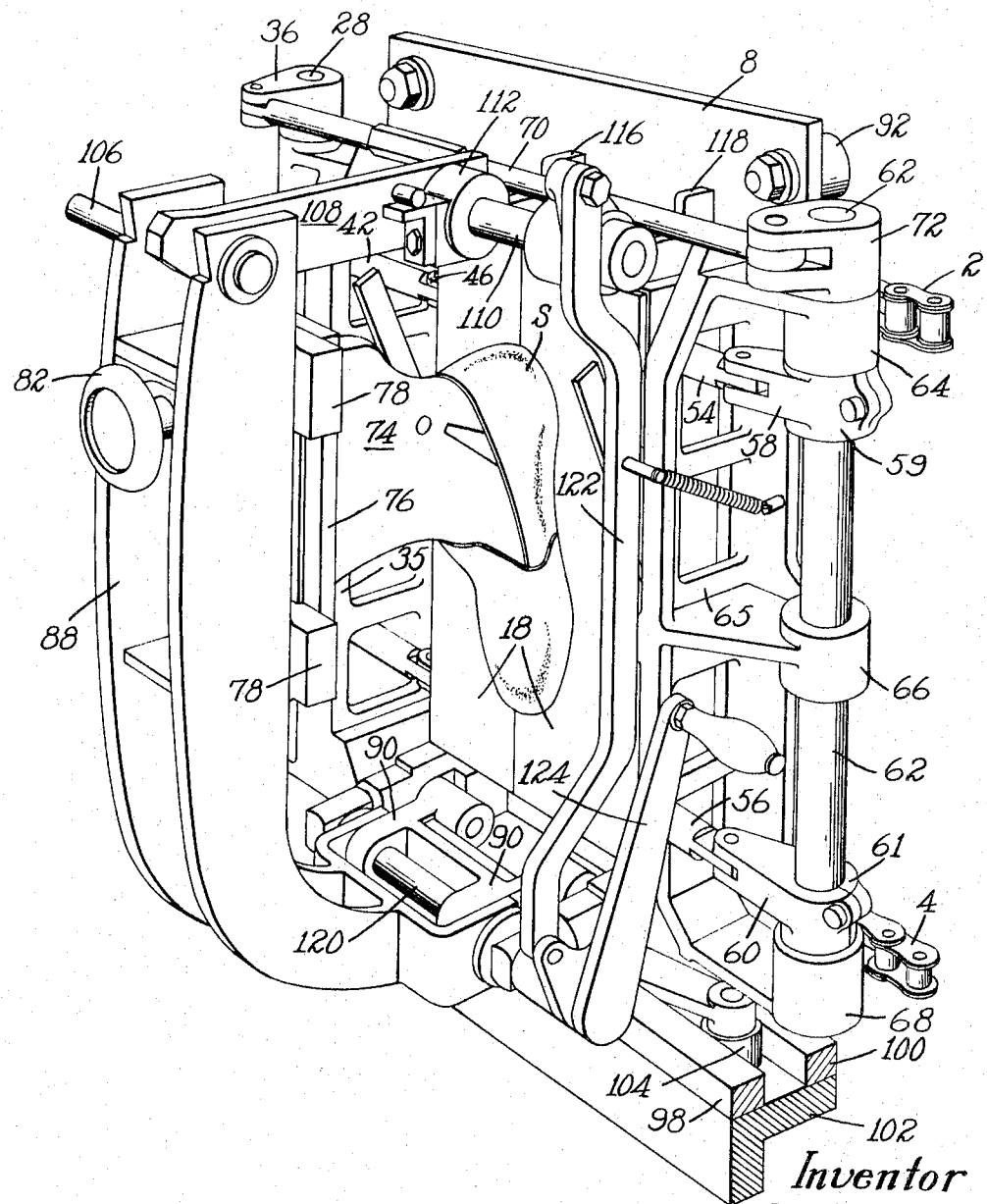
FIG. 1 is perspective view showing a portion of an illustrative machine embodying the features of the present invention.

The machine described in the above-mentioned patent is equipped with a plurality of ambulatory mold assemblies. The assemblies are uniformly spaced lengthwise on an endless conveyor comprising an upper chain 2 and a lower chain 4. Each ambulatory mold assembly is provided with two brackets 6 (FIG. 2) between which is mounted the chain 2, the illustrated brackets being secured to a vertically disposed plate 8 forming the base of the mold assembly. Similar brackets 10 are secured to the lower portion of the plate 8 for the attachment of the chain 4.

Each mold assembly includes means for supporting a lasted shoe, mold elements for molding an outsole on the shoe bottom, and means for clamping the shoe against the mold elements. The illustrative mold organization comprises side mold members 12, 14 which, in their closed position, define the periphery of an outsole, and a bottom mold member 16 complemental in shape to the bottom or tread surface of a sole. Secured to the side mold members are plates 18 which define the periphery of the shoe bottom at its juncture with the sole. The bottom mold member 16 is secured to the plate 8 by means to be described below. The side mold members are mounted on suitable holders 20, having side walls 21 and bottom walls 23, which are movable toward and from each other between horizontal rails 22, 24 positioned respectively above and below the mold holders. The holders are held against movement away from the plate 8 by retaining portions 26 of the rails 22, 24 (FIG. 4) in which slide the bottom walls 23 of the side mold holders 20.

The side mold members 12, 14 are closed against the bottom mold member by the operation of a rotatable rod 28 (FIG. 3) retained in bearing members 30, 32 and 34 which are integral parts of the carrier frame member 35. Mounted on one end of the rod 28 is a bifurcated arm 36 (FIG. 1). Also mounted on the rod 28 are a pair of collars 37, 39 (FIG. 3) having arms 38, 40 which have connecting links 42, 44 pivotally connected thereto respectively. The connecting links 42, 44 are also respectively connected to brackets 46, 48 which are secured to one of the side mold holders 20. Thus, rotation of the rod 28 causes lateral movement of the side mold 12 toward or away from the bottom mold member 16. The side mold holder on the right side, as viewed in FIGS. 1 and 3, is in like manner connected through a pair of brackets 50, 52, and connecting links 54, 56 to a pair of arms 58, 60 which are extensions of collars 59, 61 fixed on a rod 62 also rotatably disposed in bearing members 64, 66, 68 which are integral parts of a carrier frame member 65. In order to provide for cooperative motion of the rods 28, 62, they are interconnected by a cross rod 70 (FIG. 1) which extends from the bifurcated member 36 to a bifurcated member 72 mounted on the rod 62.

A lasted shoe S is mounted on a shoe form 74 which is attached to a plate 76. The plate 76 is removably attached to blocks 78 by a partially threaded rod 80 (FIG. 2) having affixed to one end a hand knob 82. Each of the blocks 78 has a pin 84 which is received in a bore 86 in the plate 76. The rod 80 is retained in a bearing 87 which is fixed to a carrier arm 88. The arm 88 is pivotally mounted on carrier frame members 90 whereby to move the shoe form 74 substantially into and out of engagement with the side mold members when they are in the closed position, as illustrated in FIG. 1. The partially threaded rod 80 passes through the upper block 78 (there being two blocks, as viewed in FIG. 2), and a threaded end 81 of the rod engages a threaded cavity 77 in the plate 76. By turning the knob 82, an operator can cause the plate 76 to be held snugly against the blocks 78 or be loosened for removal from the blocks 78.

During the movement of the ambulatory mold assemblies each assembly is supported by the engagement of two rolls 92 (one shown in FIGS. 1 and 2) with a rail 94 secured to the machine frame. For determining the path of movement of the rolls 92 on the rail 94 a guide wheel 96 is constructed and arranged to run in a suitable groove 98 provided in the rail 94. The lower portion of the ambulatory mold assembly is held against forward and rearward movement by two parallel rails 98 and 100 mounted on a channel member 102 secured to the machine frame. Two guide rolls 104 (one shown in FIG. 2) carried by and extending downwardly from the ambulatory assembly travel between the two rails 98 and 100.

The carrier arm 88 is provided with a cross pin 106 which receives a latch hook 108. The latch 108 is pivotally mounted on a shaft 110 retained by a bearing member 112 which is connected by a mounting member 116 to the base plate 8. The shaft 110 has an off-set portion 114 (FIG. 2). The cross shaft 110 and a lower cross shaft 120 having an offset portion 118 are interconnected by a link 122 which is movable by a lever 124 which is connected to the lower cross shaft 120. Movement by the operator of the lever 124 upwardly serves to clamp the lasted shoe against the inner margins of the plates 18, as is fully described in U.S. patent application Ser. No. 231,222, filed Oct. 17, 1962, now Patent No. 3,200,438, in the name of Donald B. McIlvin, directed in part toward this particular feature.

As is fully described in the above-mentioned Baker et al. patent, the conveyor mechanism advances the ambulatory mold assemblies successively from a loading station, in which a lasted shoe is mounted in the assembly, to an injection station in which the mold cavity is charged with plastic thereby to form a sole on the shoe bottom. From the injection station the conveyor mechanism successively advances the ambulatory mold assemblies in a plurality of steps along the path of movement of the conveyor to the loading station where the mold is opened and the shoe is removed from the shoe form.

There will now be described the means facilitating rapid interchange of mold parts without the use of hand tools. Referring particularly to FIG. 4, it will be seen that the side mold holders 20 are provided with notched end blocks 200 which are constructed and arranged to receive and retain the side mold members 12, 14, which are adapted, at their upper and lower ends 201, to intermesh and interlock with the end blocks. Each of the side mold members 12 and 14 has threaded therein a projection in the form of a headed plug 202. Pivotally attached to each side mold holder is a lever 204 which has a recess 206. Each side mold holder 20 is also provided with an aperture 208 which is sufficiently large to receive the head of the headed plug 202. The levers 204 are pivotally mounted by pivot pins 210, 212 so as to move the recesses 206 into and out of alignment with the apertures 208. Thus, in order to effect a change in side mold members the following procedure is followed, taking the left hand side mold member 12 of FIG. 4 as an example. The lever 204 is pulled in a direction outwardly from the base plate 8 by the operator. The mold member 12 is moved to the right slightly until the notched end block 200 and the side mold member 12 are aligned so that the mold member can be moved straight outwardly from the mold assembly. Movement of the mold member to properly align the mold member and the end block also serves to remove the plug 202 from the aperture 208 so that the plug does not obstruct withdrawal of the mold member from the mold holder 20. A new side mold member is then aligned with the end blocks 200 and pushed toward the base plate 8 and leftward, as viewed in FIG. 4. The leftward movement causes interlocking of the end blocks and the mold member and also causes the plug 202 to pass through the aperture 208. The operator then pushes the lever 204 toward the base plate 8. The recess 206 in the lever 204 passes around the plug 202 beneath the head until the trailing edge of the recess 206 engages the shank of the plug, locking the side mold member against movement relative to the mold holder. The same procedure is then followed with respect to the right hand side mold member.

The bottom mold member 16 is provided with a sprue member 220 (FIG. 4) having a portion 222 projecting rearwardly from the mold member, the portion 222 having a reduced diameter portion, or annular groove, 224 and a head portion 226. It is through the sprue member that the injection molding material enters the mold cavity. The base plate 8 has an aperture 228 for receiving the head and groove portions 226, 224 of the sprue conduit. A locking plate 230 is held flush against the back of the base plate 8 by retaining blocks 232. A coil spring 234 interconnects the locking plate 230 and the base plate 8 whereby to urge the locking plate to the right as viewed in FIG. 4. One end of the locking plate is provided with a hand hole 236 for facilitating the operator's moving of the locking plate against the influence of the spring 234. The locking plate is also provided with an aperture 238 comprising a slot 240 terminated at one end by a hole 242. The diameter of the hole 242 is sufficient to receive the head portion 226 of the sprue member. The slot 240 is large enough to ride about the annular groove 224 of the sprue member but not large enough to permit passage of the sprue member head 226. To change bottom mold members, the operator grasps the locking plate in the area of the hand hole and pulls it leftward as viewed in FIG. 4, against the influence of the spring 234. The locking plate slides in the retaining blocks 232 until the enlarged portion of the aperture 238, i.e., the hole 242, is aligned with the head 226 of the sprue member. The operator then draws the bottom mold member forwardly from the mold assembly. A new bottom mold member is inserted so that its sprue member head 226 passes through the aperture 228 and the hole 242. He then releases the plate 230 which, under spring pressure, slides to the right, causing the slot portion 240 of the aperture 238 to engage the groove 224 of the sprue conduit, locking it in place.

When, in the operation of a machine as described in the above-mentioned Baker et al. patent, it becomes necessary to change mold members to facilitate a different size or style of shoe, the operator attends to each ambulatory mold assembly as it arrives at the loading and unloading station. Assuming all mold parts are to be changed, the operator first manipulates the hand knob 82 until the plate 76 is no longer held to the blocks 78. He then removes the shoe form 74 and plate 76 as a unit and sets it aside. The operator then pulls the locking plate 230 leftward to release the bottom mold member which is then withdrawn and set aside. Next, the operator pulls the levers 204 and removes the side mold members as heretofore described. He then inserts the new side mold members, followed by a new bottom mold member, and a new shoe form. All of the mold components are thus easily and quickly changed without the use of hand tools. The advantages of such an arrangement, as compared to the usual one in which at least two bolts retain each mold member in the assembly, may be readily appreciated. Practice has shown total mold changing time for one assembly to be in the order of one and a half minutes.

Although the invention has been illustrated in connection with a machine of the type described in the above mentioned patent to Baker et al. and patent application of McIlvin, it is to be understood that the invention is readily adaptable to other types of molding machines. For example, the quick change features of this invention have been successfully incorporated in the two-station injection molding machines described in U.S. patent application Ser. No. 388,070, filed Aug. 7, 1964, in the names of Leslie C. Battell et al., and in U.S. patent application Ser. No. 452,213, filed Apr. 30, 1964, in the names of Charles J. Kitchener et al.

Having thus described my invention, what I claim as new and desire to secure by Letters Patent of the United States is:

1. A mold assembly for injection molding comprising a base plate, a bottom mold member having a sprue member extending therefrom, said base plate having an aperture for receiving said sprue member, means mounted on said base plate and engageable with said sprue member for releasably locking said sprue member in said aperture whereby to lock said bottom mold member to said base plate, side mold members slidably disposed on said base plate for movement to engage each other and said bottom mold member, and a top mold member movable to a position for engagement with said side mold members for enclosing a mold cavity.

2. A mold assembly for injection molding of soles onto lasted footwear uppers comprising, in combination with a top mold member and side mold members, a base plate, a bottom mold member having a sprue member extending therefrom, said sprue member having a shaft portion and a head portion, said base plate having an aperture for receiving said sprue member, a locking plate mounted for sliding movement on said base plate, said locking plate having an aperture comprising a first portion of a diameter substantially equal to the diameter of said shaft portion of said sprue member and a second portion of a diameter sufficient to permit passage of the head portion of said sprue member, said locking plate being selectively movable to position said aperture so that said first portion of said aperture is disposed about said shaft portion of said sprue member whereby to lock said bottom mold member to said base plate, said locking plate being further selectively movable to position said aperture so that said second portion of said aperture is disposed about said shaft portion of said sprue member whereby to permit passage therethrough of said head portion of said sprue member whereby to release said bottom mold member.

3. A mold assembly for injection molding comprising a base plate, a bottom mold member having a sprue member extending therefrom, and means for releasably connecting said bottom mold member to said base plate, said releasable connecting means comprising means attached to said base plate and engageable with said sprue member whereby to secure the sprue member to the base plate.

References Cited
UNITED STATES PATENTS

| | | | |
|---|---|---|---|
| 2,429,786 | 10/1947 | Wright | 18—18 |
| 2,509,830 | 5/1950 | MacMillan | 18—18 |
| 2,567,985 | 9/1951 | Baker et al. | 18—18 |
| 2,689,375 | 9/1954 | Hugger | 18—17 X |
| 2,711,558 | 6/1955 | Baker et al. | |
| 2,907,068 | 10/1959 | Vdolek. | |
| 2,937,405 | 5/1960 | Berggren et al. | 18—30 |
| 3,006,032 | 10/1961 | Baker et al. | 18—30 |
| 3,058,152 | 10/1962 | Eldred et al. | 18—17 |
| 3,130,446 | 4/1964 | Duerksen | 18—18 X |
| 3,131,432 | 5/1964 | Battell et al. | 18—30 |
| 3,200,443 | 8/1965 | Maddox et al. | 18—18 |
| 3,203,049 | 8/1965 | Brown et al. | 18—17 |
| 3,255,493 | 6/1966 | Tutt | 18—34 X |
| 3,284,558 | 11/1966 | Ludwig | 18—42 X |

J. SPENCER OVERHOLSER, *Primary Examiner.*

J. HOWARD FLINT, JR., *Examiner.*